United States Patent
Spears

(10) Patent No.: US 9,658,717 B2
(45) Date of Patent: May 23, 2017

(54) VIRTUAL WRITING SURFACE

(71) Applicant: 1 OAK TECHNOLOGIES, LLC, Fort Collins, CO (US)

(72) Inventor: Kurt E Spears, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 425 days.

(21) Appl. No.: 13/893,963

(22) Filed: May 14, 2013

(65) Prior Publication Data

US 2014/0340361 A1  Nov. 20, 2014

(51) Int. Cl.
*G06F 3/042* (2006.01)
*G06F 3/041* (2006.01)
*G06F 3/0354* (2013.01)

(52) U.S. Cl.
CPC ........ *G06F 3/0418* (2013.01); *G06F 3/03542* (2013.01); *G06F 3/0423* (2013.01); *G06F 2203/04104* (2013.01)

(58) Field of Classification Search
CPC .................. G06F 3/03545–3/03546; G06F 3/0421–3/0428
USPC .... 345/173, 175, 179–183; 178/18.01–20.04
See application file for complete search history.

(56) References Cited

U.S. PATENT DOCUMENTS

| | | | |
|---|---|---|---|
| 3,184,847 A | 5/1965 | Rosen | |
| 3,613,066 A | 10/1971 | Cooreman et al. | |
| 4,294,543 A | 10/1981 | Apple et al. | |
| 4,420,261 A | 12/1983 | Barlow et al. | |
| 4,553,842 A | 11/1985 | Griffin | |
| 4,558,313 A | 12/1985 | Garwin et al. | |
| 4,642,422 A | 2/1987 | Garwin et al. | |
| 4,688,933 A * | 8/1987 | Lapeyre | 356/3.16 |
| 5,196,835 A * | 3/1993 | Blue et al. | 345/175 |
| 5,231,381 A | 7/1993 | Duwaer | |
| 5,248,856 A | 9/1993 | Mallicoat | |
| 5,365,461 A | 11/1994 | Stein et al. | |
| 5,502,568 A | 3/1996 | Ogawa et al. | |
| 5,734,375 A * | 3/1998 | Knox et al. | 345/168 |
| 5,933,812 A | 8/1999 | Meyer et al. | |
| 6,091,405 A | 7/2000 | Lowe et al. | |
| 6,362,468 B1 | 3/2002 | Murakami et al. | |
| 6,437,314 B1 * | 8/2002 | Usuda et al. | 250/221 |
| 6,480,187 B1 | 11/2002 | Sano et al. | |
| 6,522,395 B1 | 2/2003 | Bamji et al. | |
| 6,603,464 B1 * | 8/2003 | Rabin | 345/179 |
| 6,816,537 B2 | 11/2004 | Liess | |

(Continued)

*Primary Examiner* — Hang Lin

(57) ABSTRACT

Systems and methods for determining a location of a stylus on a planar surface are provided. In one example, a system includes a first optical source, a second optical source, a stylus, and electrical circuitry. The optical sources are at source locations and configured to rotationally sweep optical beams along the planar surface. The optical beams include encoded data sequences that vary with time. The stylus contains at least one optical receiver and is configured to receive the optical beams. The stylus is also configured to detect the data sequences from the optical beams. The electrical circuitry is configured to determine angular relationships between the stylus and the source locations based on the detected encoded data sequences. The electrical circuitry is also configured to calculate coordinates of the stylus on the planar surface based on the angular relationships and the source locations.

29 Claims, 7 Drawing Sheets

(56) References Cited

U.S. PATENT DOCUMENTS

| | | |
|---|---|---|
| 6,906,702 B1 | 6/2005 | Tanaka et al. |
| 7,050,048 B2 | 5/2006 | Ito |
| 7,532,206 B2 | 5/2009 | Morrison et al. |
| 8,009,152 B2 | 8/2011 | Kim et al. |
| 8,035,612 B2 | 10/2011 | Bell et al. |
| 8,355,012 B2 | 1/2013 | Chen et al. |
| 8,373,657 B2 | 2/2013 | Hildreth |
| 8,390,718 B2 | 3/2013 | Robinson et al. |
| 8,416,217 B1 | 4/2013 | Eriksson et al. |
| 8,558,804 B2 | 10/2013 | Chen |
| 8,619,061 B2 | 12/2013 | Yen et al. |
| 8,723,789 B1 | 5/2014 | Rafii |
| 8,797,446 B2 | 8/2014 | Chou |
| 2001/0022579 A1 | 9/2001 | Hirabayashi |
| 2002/0015159 A1 | 2/2002 | Hashimoto |
| 2003/0071858 A1 | 4/2003 | Morohoshi |
| 2006/0007123 A1 | 1/2006 | Wilson et al. |
| 2006/0028442 A1 | 2/2006 | Bynum et al. |
| 2006/0132459 A1 | 6/2006 | Huddleston et al. |
| 2006/0202974 A1 | 9/2006 | Thielman |
| 2008/0062149 A1 | 3/2008 | Baruk |
| 2008/0225017 A1 | 9/2008 | Kim et al. |
| 2008/0259053 A1 | 10/2008 | Newton |
| 2009/0276734 A1 | 11/2009 | Taylor et al. |
| 2010/0066704 A1 | 3/2010 | Kasai |
| 2010/0085329 A1 | 4/2010 | Tseng et al. |
| 2010/0090986 A1* | 4/2010 | Wang .................... 345/175 |
| 2010/0295821 A1 | 11/2010 | Chang et al. |
| 2011/0043484 A1 | 2/2011 | Huang et al. |
| 2011/0051120 A1 | 3/2011 | Hartman et al. |
| 2011/0155479 A1 | 6/2011 | Oda et al. |
| 2011/0169775 A1 | 7/2011 | Liaw et al. |
| 2011/0205340 A1 | 8/2011 | Garcia et al. |
| 2011/0291988 A1 | 12/2011 | Bamji et al. |
| 2012/0018625 A1 | 1/2012 | McCarthy et al. |
| 2012/0056807 A1 | 3/2012 | Chapman et al. |
| 2012/0062905 A1 | 3/2012 | Kiyose |
| 2012/0065914 A1 | 3/2012 | Kiyose |
| 2012/0098795 A1 | 4/2012 | Lu et al. |
| 2012/0120028 A1 | 5/2012 | Kiyose |
| 2012/0127124 A1 | 5/2012 | Zanone et al. |
| 2012/0293555 A1 | 11/2012 | Okano |
| 2014/0204037 A1 | 7/2014 | Kim |
| 2015/0049063 A1 | 2/2015 | Smith et al. |

\* cited by examiner

VIRTUAL WRITING SURFACE

FIELD

The present application relates to systems, apparatuses, and methods for determining a location of an object on a surface.

BACKGROUND

Traditional chalkboards and whiteboards have significant drawbacks. First, they do not readily allow a user's writing to be superimposed over information electronically displayed on an electronic display. Second, they require a specialized writing surface that is compatible with chalk, dry erase markers, or similar writing tools. Third, the written information is not easily captured electronically for computerized processing or display. While some whiteboards have electronic scanning capability, these systems are typically costly for large whiteboards as a scanning mechanism must typically span an entire dimension of the whiteboard and be configured for mechanical movement across the other dimension of the whiteboard.

Written information is often electronically captured using an electronic touchpad that translates the motion of a stylus, a user's finger, or another pointing device into electronic information. The information is typically captured relative to a position of the stylus, pointer, or finger on a surface or on a display screen. Touchpads are commonly overlaid on a display screen, such as on a smartphone or tablet computer. Touchpads are also sometimes implemented in or on a non-display surface such as a digitizing tablet. A touchpad typically allows information to be electronically captured more efficiently than other methods as the user is not required to enter the information using a traditional input device such as a keyboard or mouse. In addition, the touchpad enables the user to provide freehand or freeform written input.

Touchpads typically operate using one of several methods including capacitive sensing, conductance sensing, and/or using a pressure sensitive membrane. Each of these methods requires that the surface be overlaid with electrical circuitry and/or the mechanical means which enable the surface to be touch sensitive. The cost of adding touch sensitive capability to larger displays increases proportionally with the area of the screen. Consequently, touch input capabilities can be prohibitively expensive as display sizes increase. For this and other reasons, large numbers of displays are sold without touch input capability. It is desirable to add touch input capabilities to these displays in a cost effective manner. In addition, it may be desirable for a user to provide written input using a stylus or finger on a surface other than on a display.

SUMMARY

A system for determining a location of a stylus on a planar surface is provided. The system includes a first optical source, a second optical source, a stylus, and electrical circuitry. The first optical source is at a first source location and is configured to rotationally sweep a first optical beam along the planar surface. The first optical beam includes a first encoded data sequence that varies with time. The second optical source is at a second source location and is configured to rotationally sweep a second optical beam along the planar surface. The second optical beam includes a second encoded data sequence that varies with time. The stylus contains at least one optical receiver and is configured to receive the first optical beam and the second optical beam. The stylus is also configured to detect the first encoded data sequence from the first optical beam and detect the second encoded data sequence from the second optical beam. The electrical circuitry is configured to determine a first angular relationship between the stylus and the first source location based on the detected first encoded data sequence and determine a second angular relationship between the stylus and the second source location based on the detected second encoded data sequence. The electrical circuitry is also configured to calculate coordinates of the stylus on the planar surface based on the first angular relationship, the second angular relationship, the first source location, and the second source location.

Other techniques introduced herein also include other systems, apparatuses, and methods with various components. The techniques introduced here may also include non-transitory machine-readable storage media storing instructions that, when executed by one or more computer processors, direct the one or more computer processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

Figure 1:
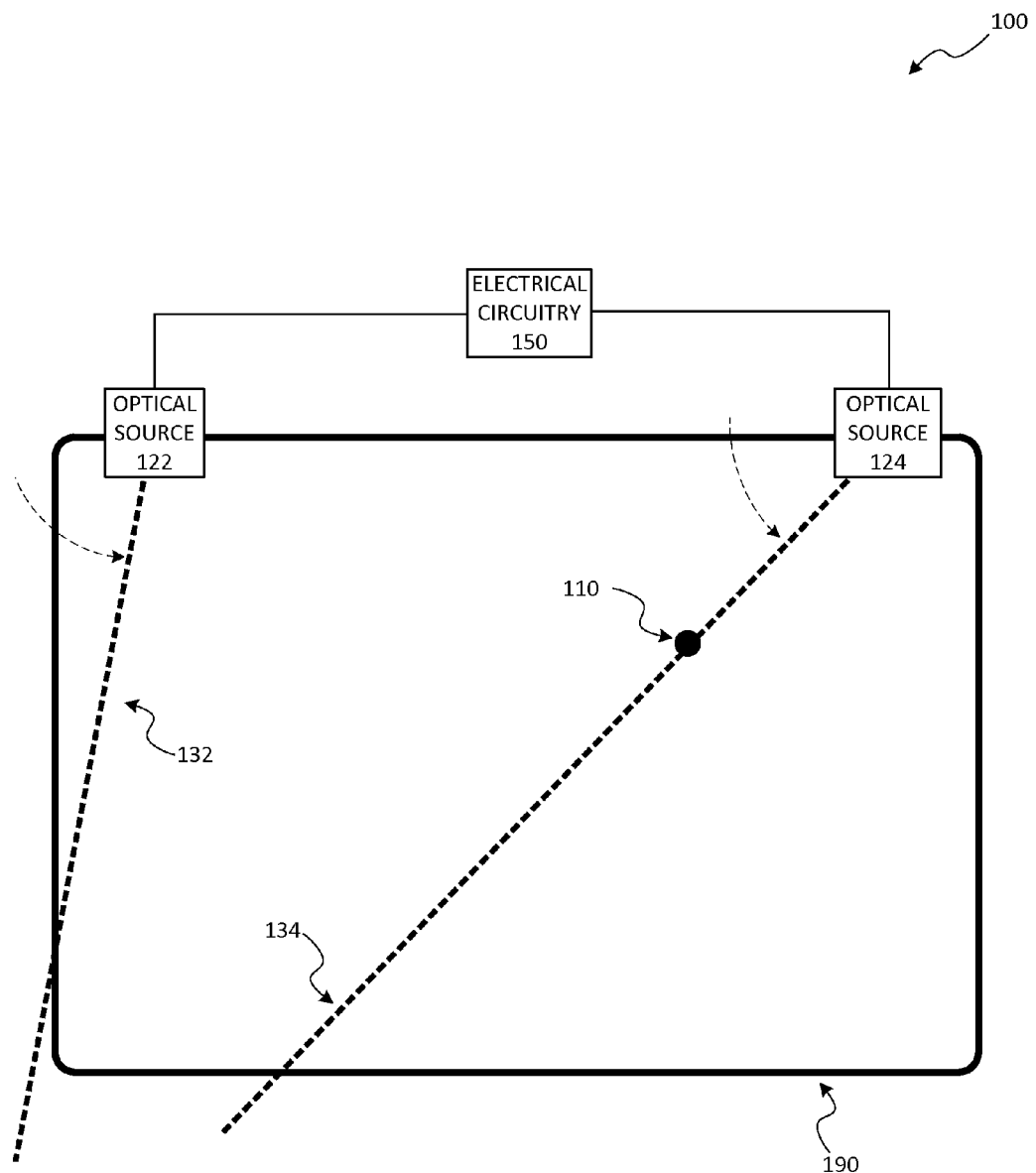
FIG. 1 illustrates a system for determining a location of a stylus on a planar surface.

In the following detailed description, various specific details are set forth in order to provide an understanding of and describe the systems, apparatuses, and techniques introduced here. However, the systems, apparatuses, and techniques may be practiced without the specific details set forth in these examples. Various alternatives, modifications, and/or equivalents will be apparent to those skilled in the art without varying from the spirit of the introduced systems, apparatuses, and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Various types of electronic whiteboards and interactive displays have been developed to address the shortcomings of traditional whiteboards and chalkboards discussed above. Some of these systems use touchpads or touchscreens that span an entire display or writing area. While this approach has been widely accepted for devices such as smartphones and tablet computers with relatively small displays, touchscreens are a costly solution when a large display and/or writing area are desired. Other systems for capturing written information on a surface use a large number of sensors and/or mirrors placed around the periphery of the writing surface. This approach also has the disadvantage of being costly and is not easily adaptable to existing displays which do not have touch input capability. Other systems use one or more of various types of cameras which view the writing surface from a distance in order to capture the movements of a stylus or capture writing on the surface. In addition to also using costly components, these systems require that some of the components be positioned away from the writing surface in a position in which they can view the writing surface. This type of configuration requires additional space, often has more complex setup and configuration requirements, and requires a view of the writing surface that is not obstructed by users or objects.

Systems, apparatuses, methods, and techniques are introduced here that resolve the shortcomings discussed above. In one example, a system for determining a location of a stylus on a planar surface is provided. The cost of the components in the disclosed systems are lower than in existing solutions and require less physical space. In addition, the systems disclosed here may be readily adapted to existing electronic displays.

The examples and descriptions which follow use the term "write" and "writing" to describe motions a user makes with a stylus, finger, pointer, or other object. As used herein, "writing" may not actually include making a physical mark on a surface or object. The "writing" may simply include physical motions which are electronically captured using the techniques described here. Using the techniques disclosed here, "writing" may be performed without physically marking a surface, without using a device that is capable of physically marking a surface, and/or without a surface that is capable of being physically marked. In addition, "writing" may represent information or communications other than words, letters, and numbers. "Writing" may include artistic representations, symbols, or other forms of information or communication that, using traditional methods, would be marked on some type of object or surface. In some examples, "writing" is electronically displayed on a display device as a representation of a physical mark even though no physical mark was made.

Furthermore, many of the techniques disclosed here are discussed in terms of determining a location of a stylus or an object on a surface. It should be understood that writing or writing motion can be captured and approximated by determining successive locations of the stylus or the object over a period of time. The successive locations represent a path of the stylus or writing object across the surface. The locations may be sampled periodically at a frequency that is high enough relative to the writing motion to enable the writing to be appropriately approximated.

FIG. 1 illustrates system 100 for determining a location of a stylus on a planar surface. System 100 includes optical source 122, optical source 124, stylus 110, and electrical circuitry 150. Although system 100 is illustrated with respect to planar surface 190, planar surface 190 need not be a component of system 100 and system 100 may be operated with respect to any "writing" surface. In some cases, system 100 may be operated using a wall, a table, a floor, a surface of an electronic display, or another surface that may not be traditionally described as a writing surface.

Each of optical source 122 and optical source 124 are sources of a beam of optical energy that can be rotationally swept across planar surface 190. The term "optical" is used broadly to refer to electromagnetic energy in the visible, ultraviolet, and/or infrared spectrums. In other implementations, sources that produce other forms of electromagnetic radiation with similar wave properties such as X-rays, microwaves, and radio waves may also be used. Optical beam 132 and optical beam 134 are each beams of optical energy generated by optical source 122 and optical source 124, respectively. Although optical beam 132 and optical beam 134 are described herein as "beams," the optical energy associated with them does not need to be completely collimated. Some spreading of optical beam 132 and/or optical beam 134 is acceptable as long as the beams are sufficiently directional to accomplish the functions described below. The techniques disclosed here are not to be limited to any particular type of energy source. In one example, each of optical source 122 and 124 contain an infrared light source such as an infrared light emitting diode (ILED), infrared laser diode, or infrared laser.

Each of optical source 122 and optical source 124 may include other components for projecting optical beams 132 and 134, respectively, in various directions. One mechanical implementation for accomplishing the rotation of the optical beam from a fixed source location is illustrated and explained in the discussion associated with FIG. 5. Each of optical source 122 and 124 are illustrated in FIG. 1 as being placed or attached on the top edge of planar surface 190. However, other orientations are possible. Optical source 122 and/or 124 may be placed along other edges of planar surface 190. In addition, optical source 122 and/or 124 may not be in contact with planar surface 190 or may be placed at an interior location of planar surface 190. Planar surface 190 may be a wall, a floor, a desktop, a floor, a surface of an electronic display, or any other surface that is substantially planar. However, planar surface 190 does not need to be entirely planar or smooth. It is only necessary that optical beams 132 and 134 can be rotationally swept at or near planar surface 190 without being substantially blocked by variations in planar surface 190 and while remaining within a specified distance of planar surface 190 as discussed in more detail below.

In addition to projecting optical beams 132 and 134 across planar surface 190, optical source 122 and 124 encode data sequences in their respective optical beams. For example, optical source 122 encodes data in optical beam 132 by modulating the optical energy source of optical beam 132. The optical beams may be digitally modulated using one or more methods such as on-off-keying, phase-shift keying, frequency-shift keying, amplitude-shift keying, quadrature amplitude modulation, and/or other known digital modulation techniques. The optical beams may also be modulated using one or more analog methods such as amplitude modulation, frequency modulation, phase modulation, and/ or other analog modulation techniques. Many types of encoding and/or modulation are possible and the techniques disclosed here are not to be limited to any particular method or format.

Electrical circuitry 150 contains electrical and/or electronic components for communicating with optical source 122, optical source 124, and, in some cases, with other electrical devices. Electrical circuitry 150 may include digital components, analog components, or a combination thereof. In some cases, electrical circuitry 150 may include one or more computer processors, microcontrollers, digital signal processors, and/or programmable logic. In some cases, electrical circuitry 150 may also contain firmware, software, and/or another type of machine-readable instruction that is executable by electrical hardware. Electrical circuitry 150 may receive data from optical sources 122 and 124, transmit data to optical sources 122 and 124, or exchange data bi-directionally. Electrical circuitry 150 may also include other communication capabilities, discussed in further detail below with respect to stylus 110.

As optical beam 132 is rotated or rotationally swept from optical source 122, the data modulated on optical beam 132 is varied. For example, a particular data sequence is modulated on optical beam 132 at one point in time and a changed data sequence is modulated on optical beam 132 at a later point in time. Many examples of data sequences, formats, and protocols are possible. In one example, optical source 122 modulates optical beam 132 with a digital sequence having a specified number of bits that begins with a value of zero and increments as it rotates. The data sequence may be changed or incremented each time it is modulated onto optical beam 132 such that the modulated value changes as the beam rotates.

In another example, the data sequence may be changed or incremented based on a predetermined time schedule. In this example, a same data sequence may be modulated onto optical beam 132 multiple times during a time period and then changed to a next value at the start of the next time period, the next value being modulated onto optical beam 132 multiple times during this next time period. If optical source 122 starts rotating from a known angular location and rotates at a known rate, the angle of optical beam 132 with respect to optical source 122 can be determined at any time based on a known timing relationship of the changing of the data sequence.

In yet another example, the data sequence may be incremented based on a known angle of optical beam 132 with respect to optical source 122 or with respect to a known angle of optical beam 132 with respect to planar surface 190. As will be discussed in more detail in later examples, the angle of optical beam 132 may be known based on a known rotational position of a motor or other electromechanical device that is causing optical beam 132 to rotate. In one example, the data sequence may be incremented for each degree, fraction of a degree, or number of degrees that optical beam 132 rotates (e.g., the data sequence may be incremented for each 0.1 degrees such that a data sequence with a value of 1258 indicates a rotational position of 125.8 degrees from a start or home position).

Using any of the techniques discussed above, different data sequences are modulated onto each of the optical beams in a known manner as they rotate. As discussed in further detail below, the data sequences may be reset each time the optical beam completes a full revolution, or some specified partial revolution. In other words, the data sequence may be reset to a known start value each time the optical beam rotates past a specified physical location.

Optical beam 132 may be modulated with an odd-valued data sequence and incremented by two while optical beam 134 is modulated with an even-valued data sequence and also incremented by two. In other words, in this example, optical beam 132 and optical beam 134 are each modulated with data sequences which will never be used by the other optical beam. While the changing of the data sequences in the various examples provided here is described as "incrementing," the data sequences may be changed in any known or predetermined manner or according to any pattern or formula. For example, the data sequences may be decremented or may be changed according to some other mathematical pattern or relationship.

In some cases, a rotational position or rotational angle of the optical source or optical beam may be encoded in the data sequence. In this example, the data sequence may contain a numerical value that is directly indicative or representative of an angular position of the beam (e.g., the numerical value equals the rotational angle in tenths of degrees). Alternately, the numerical value may be an arbitrary value that is known to be associated with a particular rotational angle. Many other relationships between the rotational angle of the beam and the data sequence are possible. The determination of what sequence will be modulated onto optical beam 132 may be made by optical source 122, electrical circuitry 150, or a combination thereof. In addition to the changing values of the data sequence, the modulated optical beam may also contain start bit(s), stop bit(s), parity bit(s), error correction information, or other information to aid in the detection, decoding, and/or demodulation of the data sequence from the optical beam by a receiver.

One result of the techniques discussed above is that each of optical beam 132 and optical beam 134 are rotationally swept across planar surface 190 and contain encoded or modulated data that is either indicative of the current angle of the respective beam or can be used to determine the current angle of the respective beam. The data sequences encoded in or modulated onto the optical beams change as the beams rotate. Although FIG. 1 illustrates both optical source 122 and optical source 124 rotating their respective optical beams in a counterclockwise direction, one or both of the beams may also rotate in a clockwise direction.

Various other steps may be taken, individually or in combination, to eliminate the possibility of the optical beams interfering with each other. For example, the rotational angles of optical beams 132 and 134 may be synchronized such that they do not cross each other within the area of planar surface 190. In another example, optical beams 132 and 134 may be cycled on and off in a time coordinated manner such that both beams are not active at the same time. In yet another example, optical beams 132 and 134 may have different frequencies such that they are distinguishable from each other even if they cross, are combined, or are received at a location simultaneously.

Optical source 122 and/or optical source 124 may continuously sweep through full 360 degree rotations or may sweep only through a smaller angular range. Furthermore, a mechanical rotational mechanism associated with optical source 122 and/or optical source 124 may travel through full 360 degree rotations while the associated optical beam may only be activated for one or more portions of those rotations. The rotational ranges may be adjustable or configurable within system 100 based on the orientation of optical source 122 and/or optical source 124 to the planar area or writing surface of interest. For example, optical source 122 and/or optical source 124 may be located within a planar area such that the writing surface encompasses the optical source.

Stylus 110 is any device that a user of system 100 places on planar surface 190 and moves across planar surface 190 to "write." Stylus 110 may be shaped like a writing instrument or may have some other shape. Stylus 110 contains one or more optical sensors or optical receivers capable of receiving optical beam 132 and optical beam 134. Stylus 110 may be configured such that it can receive the optical beams from any angle of incidence. When placed on any location on planar surface 190, stylus 110 receives each of optical beams 132 and 134 as they are swept past stylus 110. While stylus 110 may be in motion, it will typically be moving much more slowly than the rotational speed of the optical beams such that the position of stylus 110 will change only very minimally, if at all, between successive passes of either of the optical beams. In the example of FIG. 1, optical beam 134 is presently passing stylus 110. The optical receiver in stylus 110 receives optical beam 134 until it sweeps past stylus 110 and/or stylus 110 moves out of optical beam 134. Based on the direction of rotations of the beams indicated in FIG. 1, optical beam 132 will sweep over stylus 110 after optical beam 134 has rotated past. Stylus 110 may also contain other components such as a battery, a power switch, and a status indicator.

While it is within optical beam 134, stylus 110 receives and decodes/demodulates optical beam 134 to extract or recover the data sequence that is currently being encoded/modulated on optical beam 134. While optical beam 134 is relatively narrow, it will have a sufficient width relative to the rotational speed such that stylus 110 will be within the beam for two or more transmissions of a data sequence. In other words, the data sequences are modulated at a rate such that, as optical beam 134 passes across stylus 110, stylus 110 will be within the beam long enough to receive multiple data sequences. Stylus 110 may receive only a portion of a data sequence at a leading or trailing edge of the beam and/or may have difficulty receiving a particular data sequence due to disturbances, reflections, or other non-ideal conditions. However, a rotational speed and beam width which permits multiple data sequences to be received by stylus 110 in a single pass of the optical beam will significantly increase the likelihood that stylus 110 will receive at least one detectable data sequence in a single pass of optical beam 134.

Continuing with FIG. 1, after optical beam 134 has passed over stylus 110, optical beam 132 will pass over stylus 110 in a similar manner. At that time, stylus 110 receives optical beam 132 and detects, decodes, or demodulates a data sequence from optical beam 132. Once stylus 110 has received and processed both optical beams, stylus 110 has obtained a data sequence from each of the optical beams where the data sequences indicate, or can be used to determine, the respective angles of the optical beams at the time when they were received by stylus 110. The angles may be inherent in the received data sequences or the data sequences may be used in conjunction with other information, possibly including a mathematical formula or a lookup table, to determine the associated angles.

In one specific illustrative example, the rotational angle of zero is assumed to be the 9 o'clock position for each of optical source 122 and optical source 124. The rotational angle for each source is measured as the beam rotates counterclockwise from the 9 o'clock position. Therefore, the data sequence received by stylus 110 from optical beam 134 may indicate that the beam had an angle of 42.7 degrees when it was received by stylus 110. Similarly, the data sequence received by stylus 110 from optical beam 132 may indicate that the beam had an angle of 159.0 degrees when it was received by stylus 110. Using these two angles and the locations of optical sources 122 and 124, the location of stylus 110 can be determined using triangulation. Triangulation is a mathematical process for determining the location of a point by measuring angles to it from known points at either end of a fixed baseline, rather than measuring distances to the point directly. Distances to each of the known points are first calculated and then these distances are used to determine a location. In this case, the known points are the locations of optical source 122 and optical source 124. The determined location of stylus 110 may be represented as coordinates that are relative to the location of one or more of optical source 122 and optical source 124.

In one configuration, the task of calculating the relative location of stylus 110 based on the received data may be performed by stylus 110. In this case, the stylus transmits coordinates or a calculated location to electrical circuitry. This transmission may be accomplished using a wired electrical connection to electrical circuitry 150 (not shown) or using a wireless connection. Many types of wireless connection types, formats, and protocols are possible and the techniques here are not to be limited to any particular connection type, format, or protocol. Bluetooth and Wireless Fidelity (WiFi) are potential methods of wireless communication between stylus 110 and another device, such as electrical circuitry 150. Many other methods are possible.

In another configuration, stylus 110 transmits the detected data sequences to electrical circuitry 150 for processing. In this configuration, electrical circuitry 150 performs the calculations to determine the location, position, or coordinates of stylus 110 with respect to the location of optical source 122 and optical source 124. As will be discussed in further detail in examples that follow, the calculated location of stylus 110 can then be used for display on a display device and/or for transmission to another computing system or device. The process described above for determining the relative location of stylus 110 on planar surface 190 may be frequently repeated to determine when stylus 110 has been moved to a new location. Although these locations are discrete locations at particular points in time, they can be determined at a sufficient frequency to provide a series of discrete location points that the locations can be linked together to be representative of the movement of stylus 110 on planar surface 190. The frequency may be increased or decreased to achieve a desired resolution.

Figure 2:
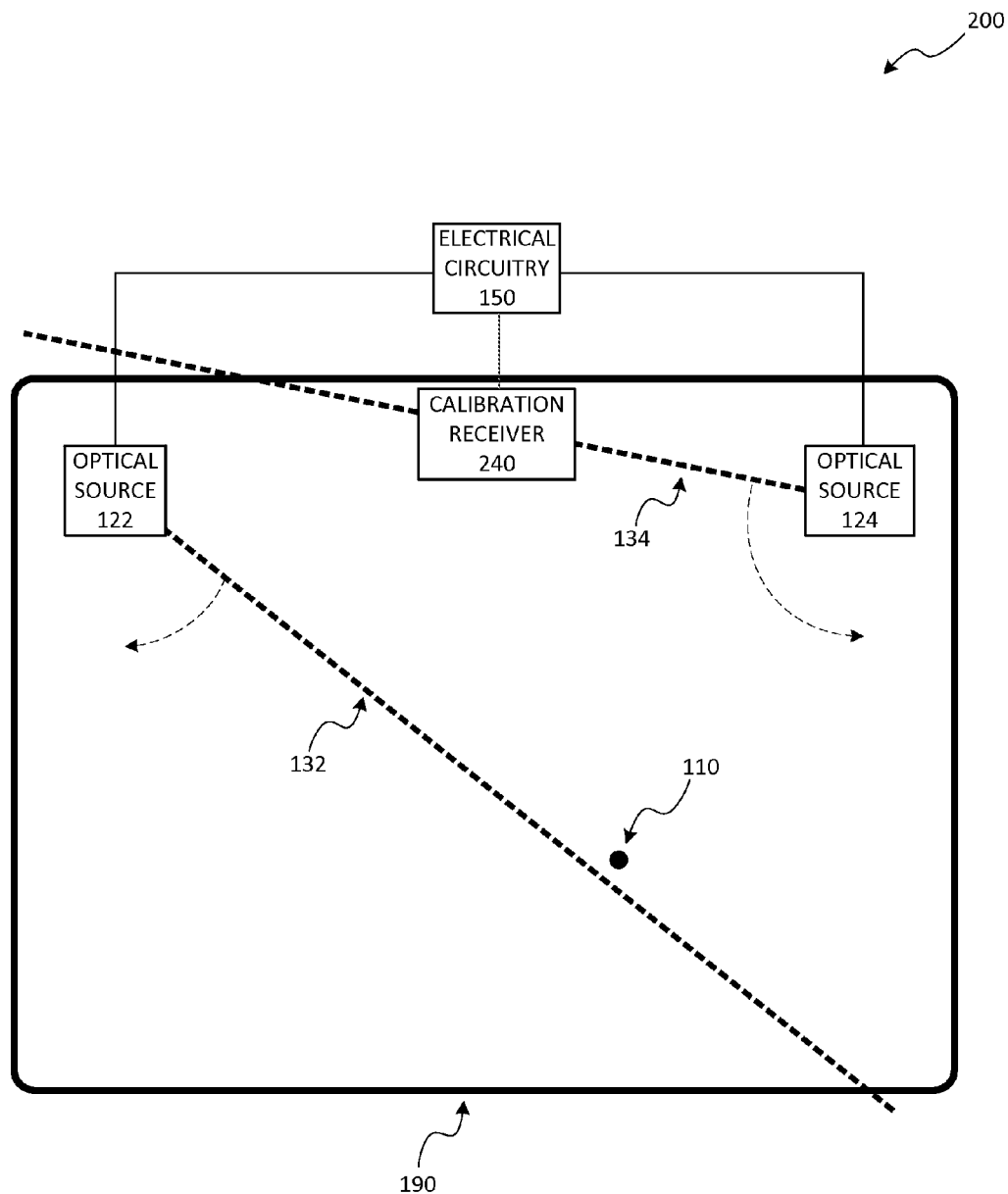
FIG. 2 illustrates a system for determining a location of a stylus on a planar surface.

FIG. 2 illustrates system 200 for determining a location of a stylus on planar surface 190. System 200 is similar to system 100 of FIG. 1 and also includes calibration receiver 240. In system 200, optical source 122 and optical source 124 are not located on the edge of planar surface 190, as with system 100, but are located within the perimeter of planar surface 190. In system 200, optical beams 132 and 134 rotate in opposite directions with respect to each other.

Calibration receiver 240 is any device, or group of devices, capable of detecting or receiving optical beams 132 and 134. Calibration receiver 240 has a known and fixed location with respect to optical sources 122 and 124. When an optical beam, such as optical beam 134, is received at calibration receiver 240, this information is used to identify or reset a home location or zero degree angular position for optical beam 134. This may be useful for maintaining the accuracy of system 200. Even if optical source 124 rotates optical beam 134 at a known speed, the speed may vary slightly over time and/or the start position may not be known. Therefore, the angular position information about beam 134 stored in optical source 124 and/or electrical circuitry 150 may be made more accurate using information received from calibration receiver 240. In one example, calibration receiver is a photodetector capable of detecting energy in a same wavelength range as that produced by optical source 122 and/or optical source 124.

In order to maintain better information about the angle of optical beam 134 at any point in time, calibration receiver 240 detects optical beam 134 as it passes. This information is transmitted to electrical circuitry 150 so that a reset or correction of the information indicating the angle of optical beam 134 can be made. This reset and a known rotation speed of optical source 124 can be used to determine the associated angle when stylus 110 later receives optical beam 134. This reset process may occur upon every rotation of optical beam 134 or may occur less frequently. A similar process may occur when optical beam 132 passes optical source 122. Although optical beams 132 and 134 have different home or zero angles, mathematical corrections may be made by electrical circuitry 150 based on known relative locations of optical source 122, optical source 124, and calibration receiver 240. In some cases, a separate calibration receiver may be associated with each of the optical sources.

System 200 operates similarly to system 100. Optical source 122 is configured to rotationally sweep optical beam 132 along planar surface 190. Optical beam 132 includes an encoded data sequence that varies as optical beam 132 is rotated. Optical source 124 is configured to rotationally sweep optical beam 134 along planar surface 190. Optical beam 134 also includes an encoded data sequence that varies with rotation and is distinct from the data sequence associated with optical beam 132. Stylus 110 contains at least one optical receiver and is configured to receive each of the optical beams and detect the associated data sequences. Electrical circuitry 150 is configured to reset a home location value associated with each of the optical sources when the associated optical beam is received at calibration receiver 240. Electrical circuitry 150 is also configured to determine a first angular relationship between stylus 110 and each of the optical sources based on the respective detected encoded data sequences. Electrical circuitry 150 is configured to then calculate coordinates of stylus 110 on planar surface 190 based on the first angular relationship, the second angular relationship, and the locations of optical sources 122 and 124. As in previous examples, these coordinates may be calculated repeatedly to determine a path of movement of stylus 110 across planar surface 190.

Figure 3:
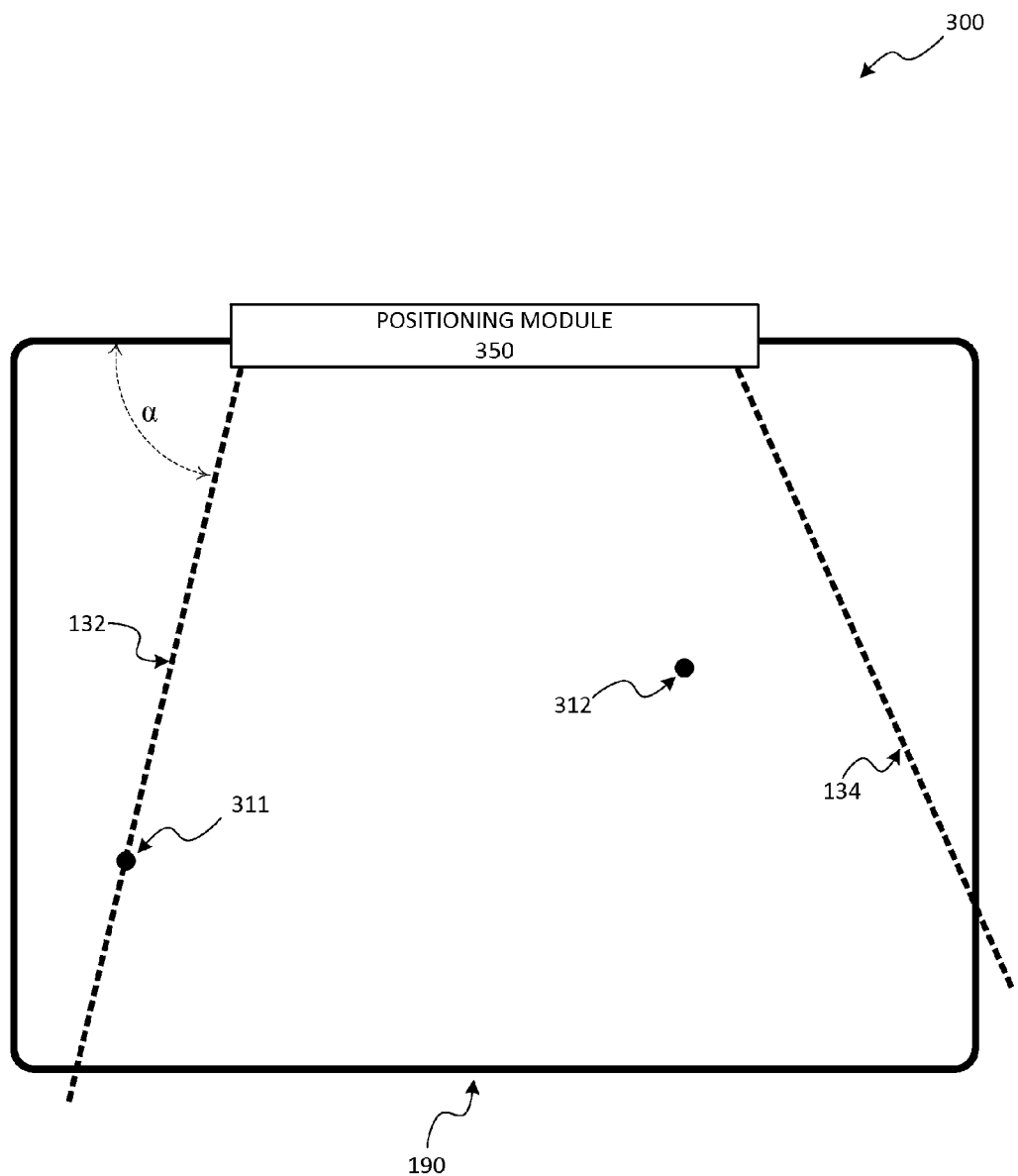
FIG. 3 illustrates a system for determining locations of two styluses on a planar surface.

FIG. 3 illustrates system 300 for determining locations of two styluses on planar surface 190. System 300 includes positioning module 350. Positioning module 350 includes two optical sources similar to optical sources 122 and 124, a home position receiver or calibration point such as calibration receiver 240, and electrical circuitry for controlling the operation of these devices such as electrical circuitry 150. In some cases, individual calibration point or calibration receivers may be associated with each of the optical sources in positioning module 350. Positioning module 350 rotationally sweeps optical beams 132 and 134 along planar surface 190 from fixed locations within positioning module 350.

Positioning module 350 operates similarly to system 100 and system 200 but provides their functions in an assembled package wherein the relative locations of the optical sources and any calibration receivers and their distances from each other are fixed. These fixed relative locations and distances simplify the triangulation and other related mathematical computations associated with determining a location of an object. Because the calibration receiver(s) are in fixed positions relative to the optical sources, the zero angle point can be associated with a visible or external surface of positioning module 350. For example, in FIG. 3, the home or zero angle of optical beam 132 is aligned with the axis of positioning module 350 such that the angle of rotation, d, of optical beam 132 is with reference to this axis. Positioning module 350 controls the rotation of the optical beams, the calibration of the optical beams, the data sequences that are modulated onto the optical beams, and the associated timing relationships. Many other markers or positioning indicators for orienting positioning module 350 with respect to planar surface 190 are possible.

System 300 includes stylus 311 and stylus 312. Both styluses may be operated in the system at the same time. As in previous examples, each stylus demodulates data sequences from each of optical beams 132 and 134. The pair of data sequences associated with each stylus (each pair including one data sequence associated with each of the two optical beams) is then used to determine the angles of the optical beams at the time they intersected the stylus. This information is then used to determine the location of each stylus relative to positioning module 350. Each of styluses 311 and 312 is in communication with positioning module 350 using either a wired or a wireless connection. As in previous examples, the calculations to determine the locations of the styluses may be performed within the styluses, may be performed in positioning module 350, or a combination thereof.

When data is transmitted from either of stylus 311 or 312 to positioning module 350, the data may include an identifier of the stylus such that positioning module 350 can process data from multiple styluses and separately track locations of multiple styluses on positioning module 350. The identifier enables positioning module 350 to determine which stylus the data is associated with. Determining locations for and tracking more than two styluses is possible using the same techniques. In some cases, one or more additional optical sources may be added to positioning module 350, or to another location on or near planar surface 190, to minimize the possibility that one of the multiple styluses blocks one of the optical beams from being received by another of the styluses. The location of any of the styluses may be determined by processing information received from any two of the optical beams. In some cases, information associated with more than two of the optical beams may be received and processed to make two or more triangulation location determinations. The result may be a more accurate overall location determination for that stylus.

When more than one stylus is used in a system, such as system 300, the output may be displayed on a display device such that the location or movements of each of the styluses is displayed in a different color. For example, all of the writing or surface movements of stylus 311 may be displayed in a blue color while all of the writing or surface movements of stylus 312 may be displayed in another color. A control feature may also limit which styluses are active at any given time. In other words, stylus 312 may be temporarily deactivated such that location information for stylus 312 is not generated and/or transmitted even if stylus 312 is in contact with or is moved along surface 190. In yet another example, one or more of the styluses may have an associated mode that indicates that displayed information associated with the stylus should be displayed in a particular color. The mode may be selected using a switch on the stylus or through another user interface setting.

In the various examples provided herein, duplicating "writing" from a stylus on a surface may also include determining when the stylus or object is actually in contact with the surface versus hovering slightly above the surface. Determining when the stylus or object is in contact with the surface may be important in generating electronic information that reflects the intended writing of the user of the stylus. Determining when the stylus is in contact with the surface, or near the surface, may be accomplished using a number of different techniques as described below.

In one example, the stylus contains a switch at its tip that is activated when the stylus is pressed against a surface. The stylus may be configured to only process and/or transmit information from the received optical beams when the switch is activated. In other words, the stylus may be close enough to the surface to optically receive the optical beams and the associated data sequences, but may not process or transmit the information received from the optical beams because the stylus is not actually pressed against the surface, as indicated by the state of the switch.

In another example, the stylus may contain a proximity sensor at its tip that indicates when the stylus is within a specified distance of a surface.

In yet another example, the stylus may contain a switch activated by the user. The operation of the stylus may be dependent upon the user activating the switch when the stylus is intended to be "writing." In this implementation, the stylus could be used without actually pressing it against a surface. Furthermore, the optical beams may rotate in a plane in space without being adjacent to a surface. In other words, the user could use the stylus to write in free space and use the switch to indicate when the stylus should be active and when it should not.

In yet another example, the optical beams may be narrow enough and directed closely enough to a planar surface such that reception of the beams by the stylus indirectly suggests that the stylus is sufficiently close to the surface to be treated as being in contact with the surface. In other words, the system may interpret that the stylus is in contact with the surface when it is very close to the surface and receiving the optical beams even though it is not actually in physical contact. In some implementations, this level of accuracy in determining contact may be sufficient to electronically approximate the user's actions.

The stylus may also be configured to detect how hard a user is pressing the stylus against a surface. This information may be used in determining characteristics of the electronic representation of the user's writing. For example, when a user presses harder on the stylus, a line width of the electronically generated line may increase to visually represent that action. This may be accomplished in a number of ways. In one approach, the stylus may include a spring loaded tip that depresses in proportion to the amount of force applied to the stylus. A sensor, such as a hall effect sensor, may be used to detect how far the tip has been depressed in the stylus. Alternately, a strain gauge or other type of pressure sensor may be used to determine how much force is being applied to the stylus by the user.

Figure 4:
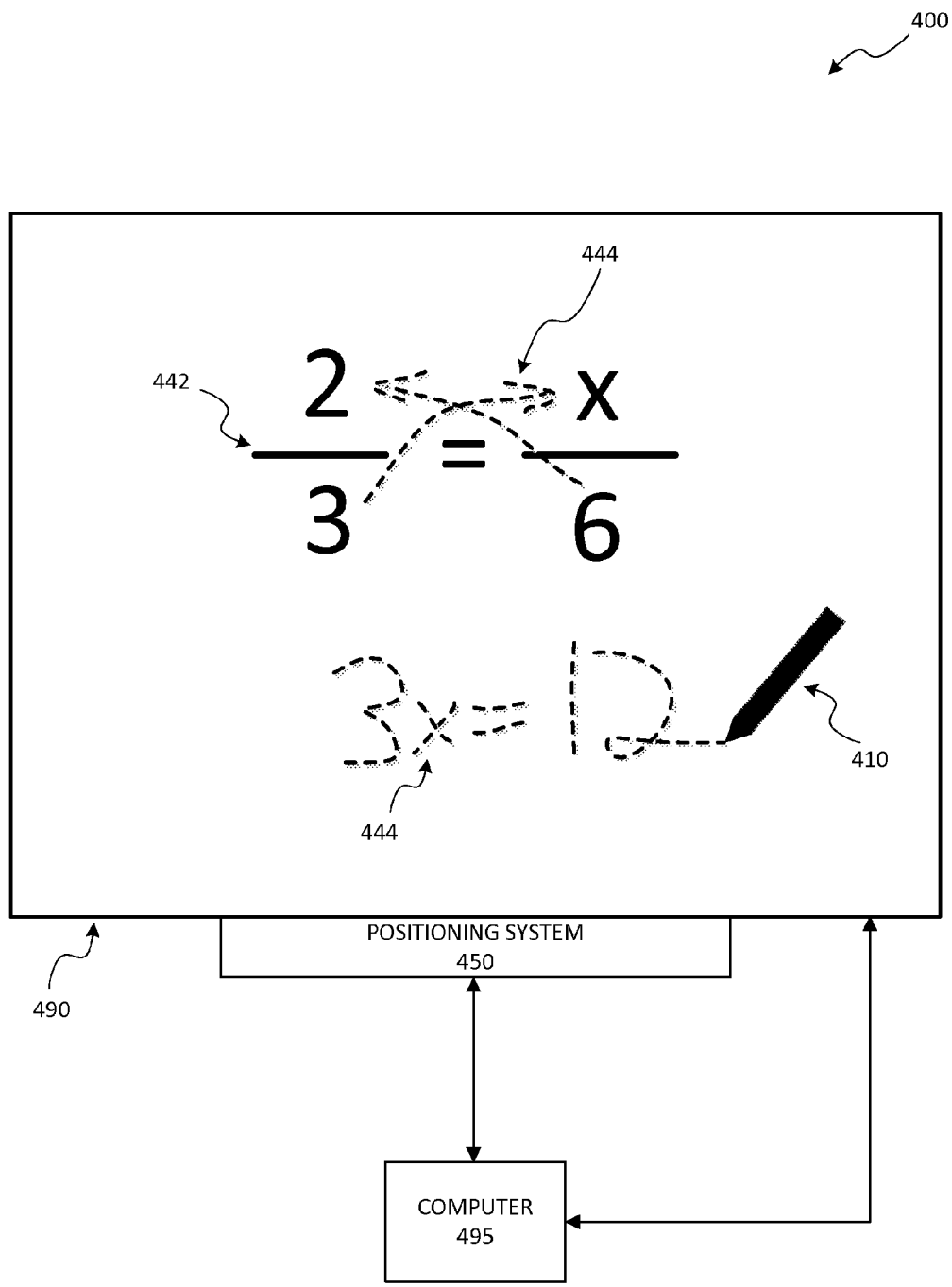
FIG. 4 illustrates operation of a virtual writing system with an electronic display.

FIG. 4 illustrates operation of a virtual writing system 400 with an electronic display 490. Electronic display 490 is any kind of information display device such as: a liquid crystal display (LCD), a plasma display, a cathode ray tube, an electrophoretic ink panel, and/or information projected on a surface by an electronic device. Display 490 does not include a touch sensitive screen or touch sensitive panel. Computer 495 controls the information displayed on display 490. Computer 495 may be any type of computing device such as a desktop computer, a notebook computer, a tablet computer, a smartphone, a server, a virtual machine, an application specific integrated circuit (ASIC), a video display controller, an analog computer, a group of computing devices, or a combination thereof. In one example, computer 495 is a notebook computer and display 490 is an LCD display for displaying information to a group of people, such as students in a classroom. Computer 495 commands display 490 to display information such as text 442 (non-broken lines) using known methods.

Virtual writing system 400 includes positioning system 450. Positioning system 450 operates similarly to positioning system 350 but is configured to be mechanically attached to an electronic display such as display 490. Positioning system 450 scans optical beams across the surface of display 490 similar to previous examples although the optical beams are not illustrated in FIG. 4 for purposes of clarity. Using one or more of the methods described previously, positioning system 450 repeatedly determines the position of stylus 410 on the surface of display 490 as a user of stylus 410 "writes" on the surface of display 490 with stylus 410. The successively captured locations of stylus 410 on display 490 are communicated to computer 495 as stylus 410 is moved across the surface. In other words, the locations are transferred from positioning system 450 to computer 495 as they are determined rather than waiting for the writing action to be complete.

Computer 495 processes the information received from positioning system 450 and displays this information in the form of text 444. Although displayed electronically, text 444 is intended to mimic the physical movement of stylus 410 on the surface of display 490 as if stylus 410 was physically marking on the surface of display 490 using traditional methods. Text 444 is illustrated using broken lines for purposes of explanation and for purposes of contrast with text 442. However, text 444 will typically be displayed as continuous lines, to the extent determined by positioning system 450, rather than with broken lines. Text 444 may be displayed in a color that is different than a color of text 442 for purposes of contrast between the existing text and the text the user has added. Adding newly written information to existing information can be very useful for purposes of presentation, instruction, and other types of communication using electronic means.

System 400 enables an electronic display, such as display 490 which does not have touchscreen or electronic whiteboard capabilities, to be adapted to function as if it has a touchscreen using a low cost attachment, such as positioning system 450, that does not require a camera or an optical area sensor. Computer 490 may also store text 444 in a file for later use including adding text 444 to the original file which contained text 442 and/or create a new file that includes both text 442 or text 444. Once computer 495 is configured to display the information received from positioning system 450, in addition to the information typically displayed by computer 450, this electronic whiteboard capability may be used with many different software programs and applications.

Because system 400 detects the movements of stylus 410 using positioning system 450 rather than directly through a surface of display 490, the techniques disclosed here may also benefit from one or more calibration process to insure that the resulting information displayed on display 490 is closely aligned with the original physical location of stylus 410 on the surface.

In one example of calibration, positioning system 450 and/or computer 495 displays one or more calibration targets or dots on display 490 and the user is requested to touch the target(s) with stylus 410. Information is received from the optical beams by stylus 410 using the techniques described herein to calculate tentative coordinates for the stylus location. If the stylus location does not match the known displayed location of the target on display 490 within a specified tolerance, mathematical corrections are applied to make the calculated location align with the known target location. This process may be performed with two or more targets in different areas of display 490.

Figure 5:
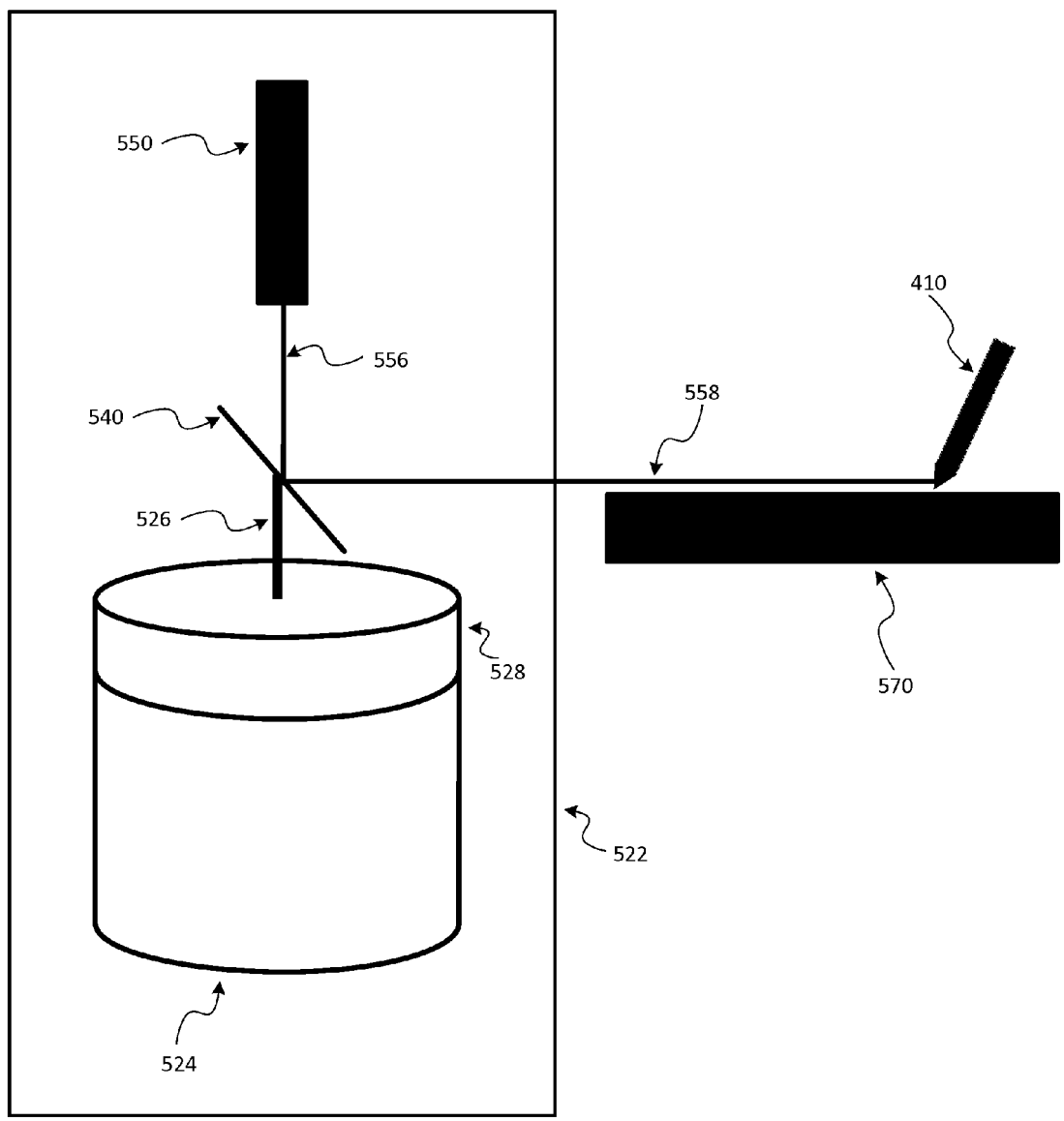
FIG. 5 illustrates an optical source for use in determining a location of a stylus on a work surface.

FIG. 5 illustrates optical source 522 used in determining a location of stylus 410 on work surface 570. As in previous examples, two or more optical beams are rotationally swept across work surface 570 to be received by stylus 410. Although two or more optical beams are required for the system operate, only one optical beam, reflected optical beam 558, is shown in FIG. 5 for purposes of clarity. It should be understood that additional optical sources and optical beams may be generated and operated in a manner similar to that described with respect to FIG. 5.

Reflected optical beam 558 is an example of optical beam 132 or optical beam 134. Reflected optical beam 558 is produced by optical source 522. Optical source 522 is an example of optical source 122 or optical source 124. Optical source 522 includes optical beam generator 550, mirror 540, shaft 526, motor 524, and, optionally, rotary encoder 528.

Optical beam generator 550 is any type of device for generating a substantially directional beam of electromagnetic energy, such as optical beam 556. Optical beam generator 550 may include one or more light emitting diodes (LEDs), laser diodes, and/or lasers. The output of optical beam generator 550 may be in the infrared spectrum, ultraviolet spectrum, and/or the visible light spectrum. One or more lenses or other optical elements (not pictured) may be used to focus, concentrate, collimate, or otherwise change one or more physical characteristics of optical beam 556. Mirror 540 is any device for reflecting or redirecting optical beam 556 to form reflected optical beam 558. In some cases, mirror 540 may have characteristics that intentionally alter the characteristics of optical beam 556 to form reflected optical beam 558. For example, mirror 540 may have optical characteristics making it more effective for reflecting particular ranges of wavelengths of light effectively making it a filtering device for reflected optical beam 558.

Motor 524 is any type of device or machine for converting electrical energy into rotational mechanical movement. Motor 524 may be a direct current (DC) motor, an alternating current (AC) motor, a stepper motor, a synchronous motor, a hysteresis motor, a reluctance motor, or a combination thereof. Motor 524 may also be another type of electromechanical device that is capable of positioning mirror 540 such as a digital micro mirror device (DMD). In the example of FIG. 5, motor 524 includes shaft 526. Shaft 526 rotates when motor 524 is operated. Therefore, when mirror 540 is attached to rotating shaft 526, reflected optical beam 558 is pointed in different directions based on an angle that mirror 540 is mounted on shaft 526 and an angle of rotation of shaft 526. Mirror 540 and motor 524 may be positioned such that reflected optical beam 558 is swept substantially parallel to work surface 570 when shaft 526 is rotated by motor 524.

Rotary encoder 528 is an electro-mechanical device that converts the angular position or motion of shaft 526 to analog or digital signals. Rotary encoder 528 may also be referred to as a shaft encoder in some cases. Rotary encoder 528 may be an absolute encoder meaning that the output indicates the actual current position shaft 526 (i.e., an angle indicator). Rotary encoder 528 may also be an incremental encoder or relative encoder meaning that it provides information about the motion of shaft 526 without providing an indication of actual position. Output of an incremental encoder is typically further tracked or processed using other circuitry, such as electrical circuitry 150, to generate information such as shaft speed, shaft position, and/or number of shaft rotations. In some cases, rotary encoder 528 may be integrated into motor 524. Rotary encoder 528 may be useful for operating systems in accordance with the techniques described herein but is optional and may not be included in some implementations.

The information about the speed and/or position of shaft 526 obtained using rotary encoder 528 may assist in determining a location of stylus 410 in a number of ways as described below.

In one example, motor 524 has a target rotation speed. The relationship between the data sequences encoded in optical beam 556 and the angle of reflected optical beam 558 with respect to optical source 522 may be dependent upon a fixed, expected rotation speed of motor 524. A control system controlling the speed of motor 524 may use output from rotary encoder 528 to more accurately control the speed of motor 524 thereby making the relationship between the data sequences received by stylus 410 and the associated angle of reflected optical beam 558 more accurate.

In another example, rotary encoder 528 includes a home position reset feature that provides a signal at least once per revolution that indicates that rotary encoder 528 is at a known physical location. If the orientation between mirror 540 and shaft 526 is known, a home position indication from rotary encoder 528 may be used to perform a home reset function similar to that described above with respect to calibration receiver 240. This enables the timing relationship between the data sequences encoded on reflected optical beam 558 and the angular position of shaft 526 to be reset, adjusted, or corrected at least at every revolution of shaft 526.

In yet another example, rotary encoder 528 may be an absolute encoder that is able to provide an absolute indication of the angular position of shaft 526, or provide information that can be used to determine an absolute indication of the angular position of shaft 526 without needing to have the shaft rotate past a home indicator or calibration receiver. In this case, the data sequences modulated onto optical beam 556 may be changed or incremented based on the direct, real-time (or near real-time) information about the angular position of shaft 526 as indicated by rotary encoder 528 rather than relying on a predicted or calculated angular position of shaft 526 that relies on an expected rotation speed of motor 524.

In FIG. 5, the size of optical source 522 and its components are not illustrated in proportion to stylus 410. Optical source 522 is depicted with larger proportions for purposes of illustration. In fact, the design of optical source 522 is such that a rotating optical beam can be accomplished within relatively small dimensions. In some cases, two or more of optical source 522 can be implemented in a module that is compact enough to be mounted at the edge of a vertically mounted flat screen display device as suggested in FIG. 3.

In some cases, some or all of the functions of both motor 524 and rotary encoder 528 may be accomplished through use of a stepper motor. A stepper motor is a brushless DC motor that divides a full rotation of the motor into a specified number of equal steps. The motor can be commanded to a specific position without any additional positional feedback mechanism and can be held at that position.

Figure 6:
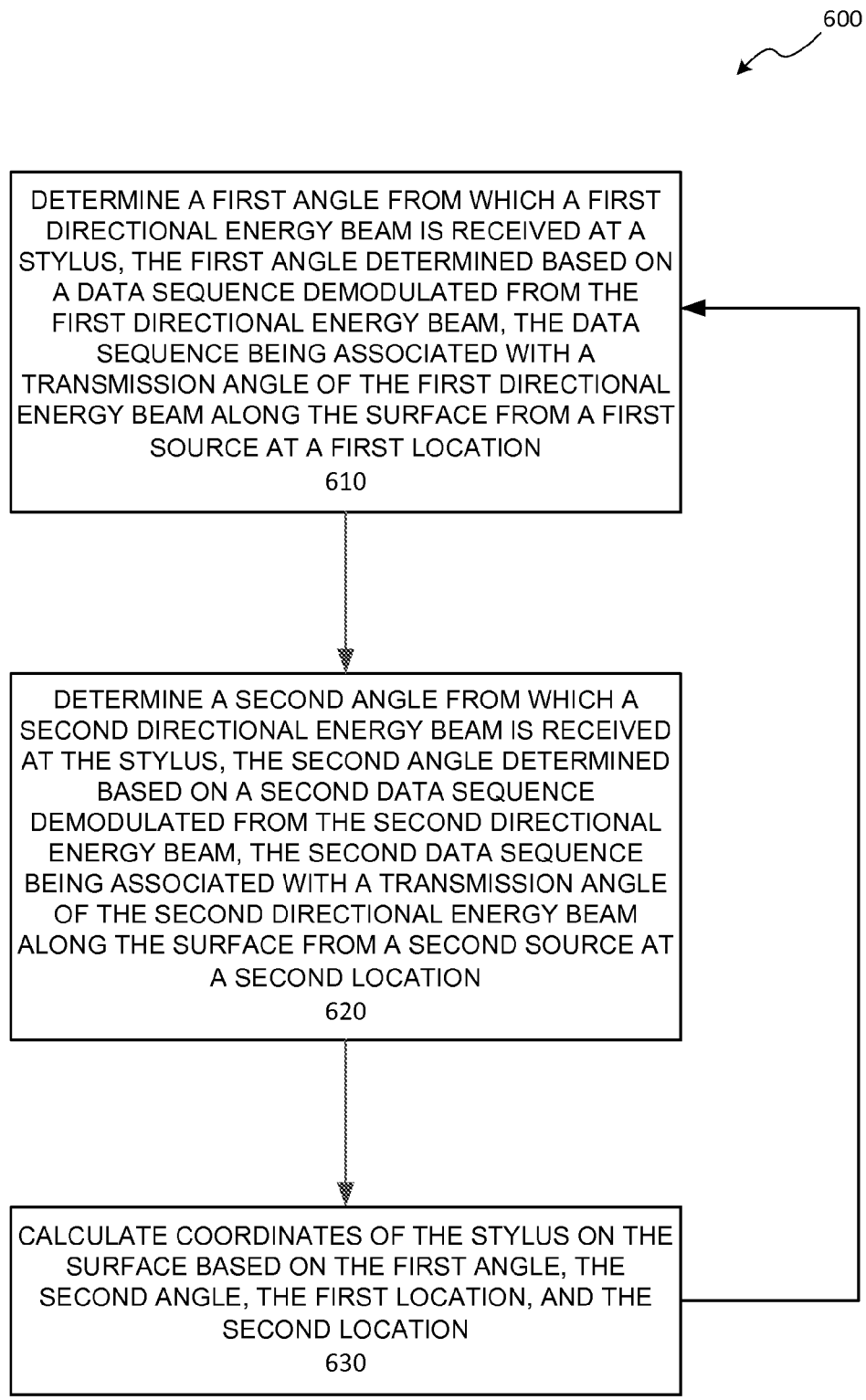
FIG. 6 illustrates a method of operating a system for determining a location of a stylus on a planar surface.

FIG. 6 illustrates a method of operating a system for determining a location of a stylus on a planar surface. The method includes determining a first angle from which a first directional energy beam is received at the stylus (step 610). The first angle is determined based on a data sequence demodulated from the first directional energy beam. The data sequence is associated with a transmission angle of the first directional energy beam along the surface from a first source at a first location. The method also includes determining a second angle from which a second directional energy beam is received at the stylus (step 620). The second angle is determined based on a second data sequence demodulated from the second directional energy beam. The second data sequence is associated with a transmission angle of the second directional energy beam along the surface from a second source at a second location. Finally, the method includes calculating the coordinates of the stylus on the surface based on the first angle, the second angle, the first location, and the second location (step 630). Many other methods of operating a system for determining a location of the stylus are illustrated in the various other examples herein.

In one variation of the techniques discussed above, data sequences are not encoded or modulated onto the optical beams and the incident angles of the optical beams at the time they are received by the stylus are determined based on information known about the position and speed of the motor shaft. In this approach, the timing of the receipt of the beams at the stylus becomes more important because it is this timing that is used to determine the angles of the beams.

One approach to using this timing-based technique to determine a location of a stylus can also be described with respect to FIG. 2. Stylus 110 is configured to detect directional energy beam 132 as it is rotationally swept across planar surface 190 from a first source location and at a first rotational speed. Stylus 110 is also configured to detect directional energy beam 134 as it is rotationally swept across planar surface 190 from a second source location at a second rotational speed. Unlike previous examples, the directional energy beams are not encoded or modulated with data sequences. Calibration receiver 240 is adjacent to planar surface 190 and has a known first angular relationship to the first source location and a second angular relationship to the second source location. In other words, the angular relationship between each of the optical sources and calibration receiver 240 is known such that the momentary angle of the directional energy beam is known when it is received at calibration receiver 240. In some cases, a separate calibration receiver may be associated with each of the directional energy beams.

Electrical circuitry 150 is configured to receive information from stylus 110 and determine a receive angle of energy beam 132 at stylus 110 based on the first angular relationship, the first rotational speed, and a difference between a time that energy beam 132 is detected at calibration receiver 240 and a time the energy beam 132 is detected at stylus 110. For example, assuming optical source 122 is rotating optical beam 132 at 60 revolutions per second. Each revolution requires 16.67 milliseconds. If stylus 110 receives optical beam 132 2.88 milliseconds after it was received at calibration receiver 240, the stylus is calculated to be 2.88/16.67=0.173 revolutions past calibration receiver 240. In other words, stylus 110 is 0.172×360=62.28 degrees past calibration receiver 240 in the rotation of optical beam 132. The receive angle of stylus 110 from optical source 124 can then be determined in a similar manner.

Finally, using triangulation, the location stylus 110 can be determined based on the calculated receive angle of energy beam 132, the calculated receive angle of energy beam 134, and the known locations of the two optical sources. Because this implementation relies on the timing of the receipt of the optical beams at stylus 110 rather than relying on data encoded in the beams, management of the timing relationships between signals is more critical. Timing management may be performed in several ways. In one example, stylus 110 may communicate with electrical circuitry using a wired connection to eliminate any delays associated with a wireless connection. In another example, some or all of the location calculations may be performed in stylus 110 rather than in electrical circuitry 150.

In another variation of the technique discussed above in which data sequences are not encoded or modulated onto the optical beams, the position of the motor associated with each of optical source 122 and 124 is known through use of stepper motor or a rotary encoder. In this case, when the stylus indicates it has received one of the beams, the known angular position of the motor is recorded. After an angle associated with the other motor is similarly obtained, the triangulation calculations are performed.

Some of the techniques discussed above are based on a specific timing relationship associated with when a stylus receives an optical beam. While the optical beams are intended to be relatively narrow, they will have finite widths and may even fan out to some extent the further they are from the source. Consequently, the stylus may receive the optical beam over a brief period of time as the beam rotates past rather than receiving it only at a single instant in time. The time of receipt may be chosen to be the temporal center of the brief period of time over which the beam is received. Alternately, an intensity or magnitude of the beam may be monitored and the time of receipt may be chosen relative to the peak intensity or magnitude. It should be understood that many other techniques such as use of medians, averages, and thresholds are possible, including combinations thereof.

Similarly, a method of determining coordinates of an object on a planar surface is disclosed. The method includes determining a receive angle of a first light beam based on a difference between a time the first light beam is received at the object and a time that the first light beam is received at a calibration location. The first light beam is directional and is rotationally swept from a first source location across the planar surface at a first known angular rate. The method also includes determining a receive angle of a second light beam based on a difference between a time the second light beam is received at the object and a time that the second light beam is received at the calibration location. The second light beam is directional and is rotationally swept from a second source location across the planar surface at a second known angular rate. Finally, the method includes determining the position of the object based on the receive angle of the first light beam, the receive angle of the second light beam, the first source location, and the second source location.

Figure 7:
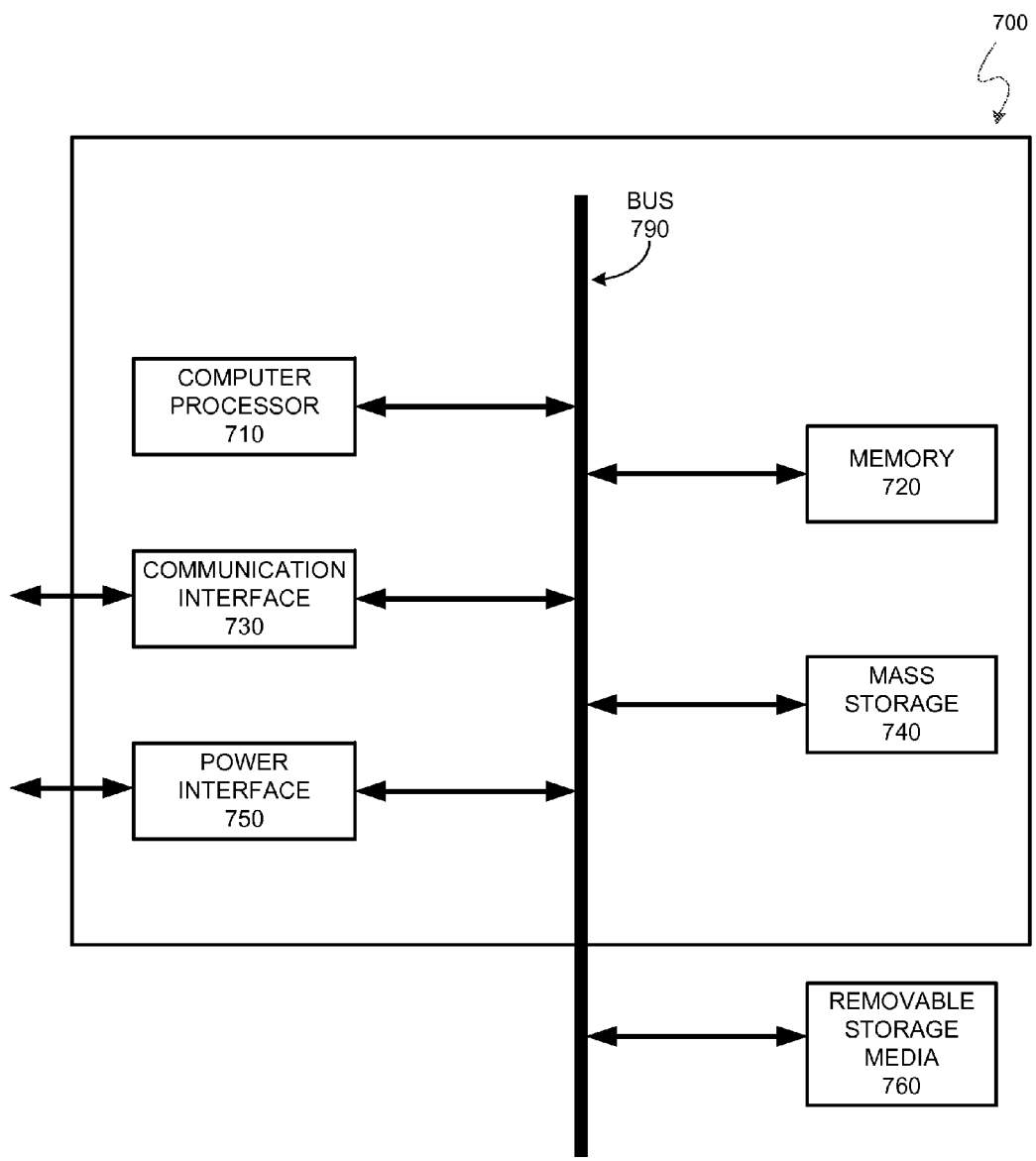
FIG. 7 illustrates a computing system that may be used in determining a location or a stylus on a planar surface.

FIG. 7 illustrates computer system 700 with which some embodiments of the techniques disclosed herein may be utilized. A computing system, such as computing system 700, may be used in or implemented in the form of electrical circuitry 150, positioning module 350, positioning system 450, and/or computer 495.

According to the example of FIG. 7, computer system 700 includes a bus 790, at least one computer processor 710, at least one communication interface 730, at least one memory 720, at least one mass storage 740, and at least one power interface 750. A removable storage media 760 also interface to bus 790 of computer system 700.

Computer processor 710 can be any known computer processor, central processing unit, microprocessor, micro-controller, programmable logic array, or programmable logic device. Computer processor 710 may also interface to a coprocessor.

Communication interface 730 can be any type of interface for communicating with another device or a network. Communication interface 730 may be configured for communicating using a wired connection, a wireless connection, audio signals, light waves, infrared, or a combination thereof. Communication interface 730 may be configured for communicating with or over a network such a Local Area Network (LAN), Wide Area Network (WAN), or any network to which computer system 700 connects. Communication interface 730 may also be configured to communicate with an electronic device such as a cellular phone, a smartphone, a tablet, a laptop computer, a server, or a digital audio device. The various functions of communication interface 730 may be distributed across multiple communication interfaces. In one example, communication interface 730 is a USB interface.

Memory 720 can include random access memory (RAM), or any other type of dynamic data storage device commonly known in the art. Memory 720 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 710 or for another computer processor.

Mass storage 740 can include one or more persistent mass data storage devices or modules that may be used to store data, information, and/or instructions. Mass storage 740 may include a hard drive, a tape drive, an optical drive, flash memory, a micro electromechanical storage device, or a combination thereof.

Power interface 750 can be any type of interface for receiving and/or transmitting electrical power. The functions of power interface 750 may be spread across multiple power interfaces. The functions of power interface 750 may also be combined into a single connector and/or interface with communication interface 730. For example, the functions of communication interface 730 and power interface 750 may both be implemented in the form of one or more USB interfaces.

Removable storage media 760 can be any kind of external data storage device including a hard drive, a memory card, a subscriber identity module (SIM) card, flash memory, an optical drive, a tape drive, a micro electromechanical storage device, or a combination thereof.

Bus 790 communicatively couples the elements of computer system 700, as well as removable storage media 760. Bus 790 may conform to an industry standard bus architecture and protocol or may use a proprietary architecture and/or protocol.

Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware.

The methods and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. A system for determining a location of a stylus on a planar surface, the system comprising:
    a first optical source positioned at a first source location, the first optical source configured to rotationally sweep a first optical beam along the planar surface, wherein the first optical beam is modulated with a first encoded data sequence that varies with time;
    a second optical source positioned at a second source location, the second optical source configured to rotationally sweep a second optical beam along the planar surface, wherein the second optical beam is modulated with a second encoded data sequence that varies with time;
    a stylus containing at least one optical receiver, the stylus configured to:
        receive the first optical beam and the second optical beam;
        demodulate the first encoded data sequence from the first optical beam; and
        demodulate the second encoded data sequence from the second optical beam; and
    electrical circuitry configured to:
        determine a first angular relationship between the stylus and the first source location based on the demodulated first encoded data sequence;
        determine a second angular relationship between the stylus and the second source location based on the demodulated second encoded data sequence; and
        calculate coordinates of the stylus on the planar surface based on the first angular relationship, the second angular relationship, the first source location, and the second source location.

2. The system of claim 1 wherein the electrical circuitry is further configured to receive the first and the second encoded data sequences from the stylus using a wireless communication link.

3. The system of claim 1 further comprising a calibration receiver wherein:
    the first encoded data sequence varies according to a predetermined pattern based on an angle of transmission of the first optical beam from the first optical source; and
    the first encoded data sequence is reset to a start value of the predetermined pattern when the first optical beam is detected at the calibration receiver.

4. The system of claim 1 wherein the first optical source comprises:
    a motor having a shaft that rotates;

a mirror attached to the shaft at an angle; and
an optical beam generator that is pointed at the mirror from a direction substantially perpendicular to the planar surface such that a reflection of the first optical beam from the mirror is rotationally swept substantially parallel to the planar surface when the shaft rotates.

5. The system of claim 4 wherein to determine the first angular relationship between the stylus and the first source location based on the demodulated first encoded data sequence includes to determine an angular position of the shaft at a time when the stylus received the first optical beam.

6. The system of claim 5 wherein to determine the angular position of the shaft includes to calculate the angular position based on a known rotational speed of the motor.

7. The system of claim 5 further comprising a rotary encoder attached to the shaft and wherein to determine the angular position of the shaft includes to process data received from the rotary encoder to determine the angular position.

8. The system of claim 4 wherein the optical beam generator includes a light emitting diode that emits infrared light and the first optical source further comprises a lens for collimating the infrared light to form the first optical beam.

9. The system of claim 4 wherein the optical beam generator includes a laser diode.

10. The system of claim 1 wherein the first optical beam and the second optical beam are rotationally out of phase with each other.

11. The system of claim 1 wherein to rotationally sweep the first optical beam and the second optical beam along the planar surface includes to cycle each of the first optical beam and the second optical beam between a respective active state and an respective inactive state such that the first optical beam and the second optical beam are not both in their respective active state at a same time.

12. The system of claim 1 wherein the first optical beam has a first wavelength, the second optical beam a second wavelength that is different than the first wavelength, and the stylus further contains at least one component for distinguishing between the first wavelength and the second wavelength.

13. The system of claim 1 wherein the first encoded data sequence contains a code identifying the first optical source.

14. The system of claim 1 wherein the stylus includes a switch that is activated when the stylus is pressed against the planar surface and the electrical circuitry is further configured to calculate the coordinates of the stylus when the switch is activated.

15. The system of claim 1 wherein the stylus is configured to detect an amount of force with which the stylus is pressed against the planar surface.

16. The system of claim 15 wherein the stylus comprises:
a spring loaded tip that depresses in proportion to the amount of the force; and
a sensor to detect the amount of force by determining a distance the spring loaded tip is depressed.

17. The system of claim 1 wherein the electrical circuitry is further configured to transmit the calculated coordinates to a display system for indicating the location of the stylus.

18. A method of determining coordinates of a stylus on a surface, the method comprising:
determining, using one or more computer processors, a first angle from which a first directional energy beam is received at the stylus, wherein the first angle is determined based on a data sequence demodulated from the first directional energy beam, the data sequence varying with a transmission angle of the first directional energy beam along the surface from a first source at a first location;
determining, using the one or more computer processors, a second angle from which a second directional energy beam is received at the stylus, wherein the second angle is determined based on a second data sequence demodulated from the second directional energy beam, the second data sequence varying with a transmission angle of the second directional energy beam along the surface from a second source at a second location; and
calculating, using the one or more computer processors, the coordinates of the stylus on the surface based on the first angle, the second angle, the first location, and the second location.

19. The method of claim 18 wherein the first directional energy beam and the second directional energy beam are each beams of infrared light and wherein the stylus includes an infrared receiver.

20. The method of claim 19 further comprising transmitting the beams of infrared light from one or more of a light emitting diode, a laser diode, and a laser.

21. The method of claim 18 wherein the first directional energy beam has a first wavelength and the second directional energy beam has a second wavelength that is not the same as the first wavelength.

22. The method of claim 18 wherein the data sequence demodulated from the first directional energy beam includes a code identifying a source of the first directional energy beam.

23. The method of claim 18 further comprising transmitting the calculated coordinates to a display system for graphically indicating a location of the stylus on the surface.

24. The method of claim 18 further comprising incrementing the data sequence as the transmission angle of the first directional energy beam changes.

25. The method of claim 24 further comprising resetting the data sequence to a known start value when the first directional energy beam it received at a calibration receiving point having a known location.

26. A system for determining coordinates on a planar surface, the system comprising:
a receiver configured to:
detect a first data sequence encoded in a first infrared beam that is rotationally projected along the planar surface from a first source location, wherein the first data sequence varies in a predetermined pattern; and
detect a second data sequence encoded in a second infrared beam that is rotationally projected along the planar surface from a second source location, wherein the second data sequence varies in the predetermined pattern; and
at least one computer processor configured to:
determine a first angular relationship between the receiver and the first source location based on the received first data sequence;
determine a second angular relationship between the receiver and the second source location based on the detected second data sequence; and
calculate a location of the receiver on the planar surface based on the first angular relationship, the second angular relationship, the first source location, and the second source location.

27. The system of claim 26 wherein the first data sequence is reset to a start value each time the first infrared beam passes a home location, the computer processor further configured to:

receive at least one calibration data sequence that the receiver detected from at least one of the infrared beams while placed at a calibration location on the planar surface; and calculate a relationship between the predetermined variation of the data sequence and the calibration location.

28. The system of claim 27 wherein to calculate the relationship between the predetermined variation of the data sequence and the calibration location includes to determine a relationship between the predetermined variation and a known angle between the first source location and the calibration location.

29. The system of claim 27 wherein to calculate the relationship between the predetermined variation of the data sequence and the calibration includes to determine a value of the data sequence associated with a specified angle of the first infrared beam based on a rotation rate of the first infrared beam.

* * * * *